United States Patent
Rouh et al.

(10) Patent No.: US 10,599,925 B2
(45) Date of Patent: Mar. 24, 2020

(54) METHOD OF DETECTING FRAUD OF AN IRIS RECOGNITION SYSTEM

(71) Applicant: SAFRAN IDENTITY & SECURITY, Issy les Moulineaux (FR)

(72) Inventors: Alain Rouh, Issy les Moulineaux (FR); Elise Le Gouil, Issy les Moulineaux (FR); Pierre Gacon, Issy les Moulineaux (FR); Emine Krichen, Issy les Moulineaux (FR); Jean-Noël Braun, Issy les Moulineaux (FR)

(73) Assignee: IDEMIA IDENTITY & SECURITY, Issy les Moulineaux (FR)

( * ) Notice: Subject to any disclaimer, the term of this patent is extended or adjusted under 35 U.S.C. 154(b) by 0 days.

(21) Appl. No.: 15/639,714

(22) Filed: Jun. 30, 2017

(65) Prior Publication Data

US 2018/0005009 A1 Jan. 4, 2018

(30) Foreign Application Priority Data

Jun. 30, 2016 (FR) ..................................... 16 56252

(51) Int. Cl.
- *G06K 9/00* (2006.01)
- *G06F 21/32* (2013.01)

(52) U.S. Cl.
CPC .......... *G06K 9/0061* (2013.01); *G06F 21/32* (2013.01); *G06K 9/00604* (2013.01); *G06K 9/00899* (2013.01)

(58) Field of Classification Search
CPC ............. G06K 9/0061; G06K 9/00604; G06K 9/00899; G06F 21/32
See application file for complete search history.

(56) References Cited

U.S. PATENT DOCUMENTS

| 2007/0110284 A1* | 5/2007 | Rieul ................. G06K 9/00604 382/117 |
| 2009/0279790 A1* | 11/2009 | Burge ................ G06K 9/00604 382/209 |

(Continued)

FOREIGN PATENT DOCUMENTS

| FR | 2 864 298 A1 | 6/2005 |
| WO | WO 2015/127313 A1 | 8/2015 |

OTHER PUBLICATIONS

Jonghyun Park et al.; "Iris Recognition Against Counterfeit Attack Using Gradient Based Fusion of Multi-spectral Images"; Advances in Biometric Person Authentication Lecture Notes in Computer Science; Jan. 1, 2005; pp. 150-156; Springer; Berlin, DE.

*Primary Examiner* — David F Dunphy
(74) *Attorney, Agent, or Firm* — Muncy, Geissler, Olds & Lowe, P.C.

(57) ABSTRACT

A method of detecting attempted fraud against a system recognising the iris of the human eye includes generation of a first image of an iris using first means of image capture in a visible light spectrum, and generation of a second image of said iris using second means of image capture in a near infra-red spectrum. The method also includes determination of at least one characteristic of the first image as a function of respective optical characteristics of pixels of a plurality of pixels of this first image and determination of at least one characteristic of the second image determined as a function of respective luminous intensities of pixels of a plurality of pixels of this second image. As a function of these determined characteristics, a signal representative of suspected detection of attempted fraud is generated.

13 Claims, 5 Drawing Sheets

(56) References Cited

U.S. PATENT DOCUMENTS

| | | | |
|---|---|---|---|
| 2012/0242820 A1* | 9/2012 | Hanna | G06K 9/00221 348/78 |
| 2013/0223681 A1 | 8/2013 | Lee et al. | |
| 2014/0099005 A1* | 4/2014 | Mogi | G06K 9/00288 382/118 |
| 2016/0019421 A1* | 1/2016 | Feng | G06K 9/00604 382/117 |

* cited by examiner

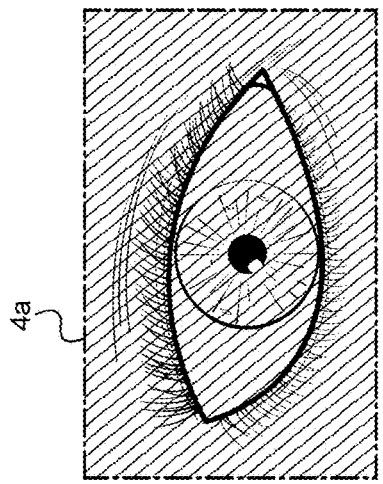
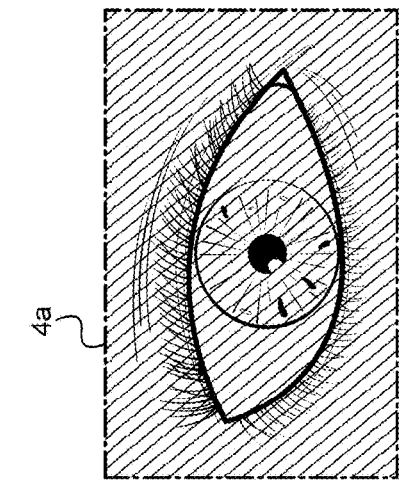
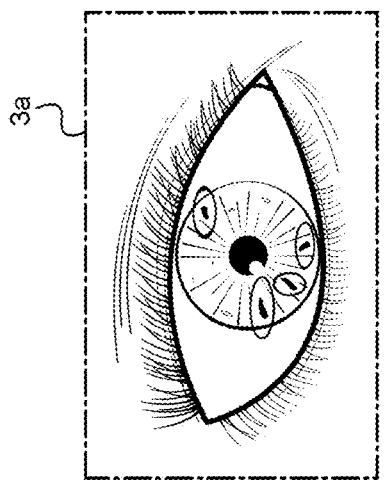
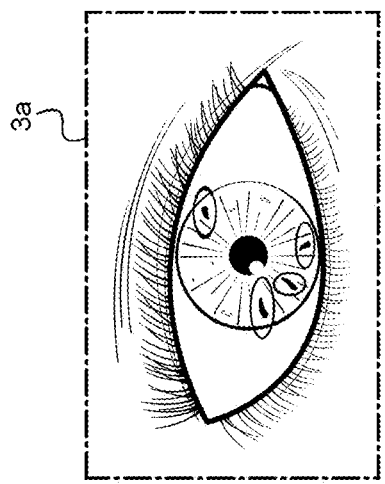
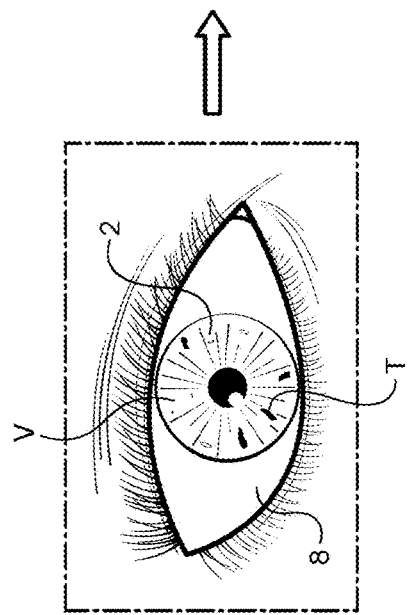
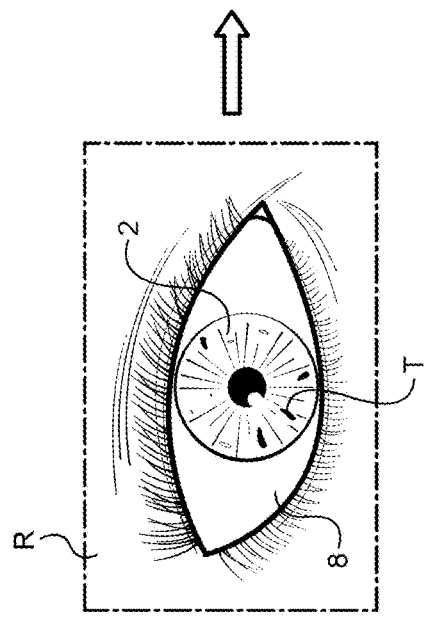
Fig. 2a
Fig. 2b

METHOD OF DETECTING FRAUD OF AN IRIS RECOGNITION SYSTEM

The present invention relates to the field of methods of detecting attempted fraud against a system for recognising the iris of the human eye.

BACKGROUND OF THE INVENTION

Generally speaking, an iris of the human eye is a coloured area encircling the pupil and surrounded by the sclera. The iris has several areas of different colours. The colour of a given area depends on the melanin density in this given area.

The greater the melanin density in this given area, the more this area will appear dark when observed in the visible light spectrum.

The quantity of melanin in a given area of the iris is liable to change over time as a function of parameters such as an individual's exposure to sunlight or an iris pigmentation disorder. This means that the colour data of the areas of the iris are inadequate to guarantee recognition/authentication/identification of a given iris of a given individual.

The iris comprises a large number of muscle fibres serving to dilate, or conversely, constrict the pupil. The majority of these fibres, approximately 6000, are arranged in radii around the pupil.

These fibres are more or less dense and more or less intertwined and form a network, the network of which is unique to each eye.

Iris recognition systems are known in applications for authenticating individuals. These systems are however susceptible to deception by presenting an image of an iris of the human eye or a dummy iris. In order to limit the risks of fraud against the iris recognition system, it has been contemplated to use an image of this iris in the visible range and an image of this same iris in the near infra-red range. Thus, document FR2864290_A1, of the same applicant, discloses a biometric detection method in which one generates:

a first image of an iris of the human eye observed using first means of image capture sensitive in a visible light spectrum; and a second image of this iris observed using second means of image capture sensitive in an infra-red spectrum.

The first colour image is used to detect the outer edge of the iris and facilitate localisation of a corresponding area of biometric interest located in the second image in the infra-red spectrum in order to seek biometric characteristics therein, in this instance textural characteristics. Authentication is performed in this case by seeking characteristics typical of the network or the texture of the iris in the area of interest of the second image in the infra-red spectrum. This document FR2864290_A1 also describes a type of attempted fraud against the system for recognising the iris of the human eye, performed by presenting an image of the iris in visible ink in the infra-red spectrum. Since this type of ink has, in the visible spectrum, a specific colour different from the colour of genuine irises, this document FR2864290 proposes a method of detecting attempt fraud by colorimetric analysis of the first image.

In order to improve security of the iris recognition system, it is useful to improve detection of instances of attempted fraud against the system.

AIM OF THE INVENTION

The aim of the present invention is to provide a method allowing detection of instances of attempted fraud against a system for recognising the iris of the human eye.

SUMMARY OF THE INVENTION

To this end, a method of detecting attempted fraud against a system for recognising the iris of the human eye is proposed according to the invention, wherein the method comprises:

generation of a first image of an iris of the human eye observed using first means of image capture sensitive in a visible light spectrum and over a frequency range covering at least 50% of the visible light spectrum, wherein this first image is a broad spectrum colour image;

generation of a second image of said iris observed using second means of image capture sensitive in a near infra-red spectrum.

The method according to the invention is essentially characterised in that it comprises:

determination of at least one characteristic of the first image determined as a function of the respective optical characteristics of pixels of a plurality of pixels of this first image; and determination of at least one characteristic of the second image determined as a function of the respective luminous intensities of pixels of a plurality of pixels of this second image; and in that as a function of said at least one characteristic of the first image thus determined and of said at least one characteristic of the second image thus determined, a signal representative of suspected detection of attempted fraud will be generated.

In the present description, the term iris always denotes an iris of the human eye. Visible light spectrum implies light of a wavelength of between 380 nm and 700 nm and near infra-red spectrum implies a light spectrum of a wavelength of between 700 nm and 950 nm.

For understanding the invention, the sensitivity of the first means of image capture in the visible light spectrum and over a frequency range covering at least 50% of the visible light spectrum implies that these first means of capture acquire light frequencies within a range extending over at least 50% of the range 380 nm-700 nm. Hence, any means of image capture that is sensitive over a total frequency bandwidth equal to at least 50% of the bandwidth 380 nm-700 nm is considered a broad spectrum means of image capture. Broad spectrum colour image implies a colour image having several colours, wherein one of these colours has a low frequency and another of these colours has a high frequency in relation to this low frequency and the difference between these high and low frequencies is at least 160 nm (i.e. a frequency interval of at least 50% of the width of the visible spectrum 380 nm-700 nm).

The optical characteristics of a pixel of the plurality of pixels of the first image comprise the luminous intensity of this pixel and/or the colour of this pixel of the colour image.

The term "iris of the human eye observed" using means of image capture includes both an observation of a genuine human iris directly positioned opposite the means of image capture and an observation of a reproduction of an iris of the human eye, wherein this reproduction of the iris is positioned opposite the means of image capture.

Generating a signal representative of a suspected instance of fraud produced as a function of a characteristic of the first image and of a characteristic of the second image makes it possible to take account of the specific aspects of both these images so as to be able to decide whether to generate the signal representative of suspected detection of attempted fraud. One can thus detect instances of fraud that would not normally be detected by separately seeking an indication of fraud in the image in the visible spectrum and another indication of fraud in the image in the near infra-red spectrum.

By way of contrast, in the present invention, account is taken both of the characteristics of the first image and the characteristic of the second image in generating the signal representative of the suspected fraud.

Additional cases of fraud can be detected in this manner.

According to a preferential embodiment of the method according to the invention, using said at least one characteristic of the first image thus determined and said at least one characteristic of the image thus determined, a similarity parameter representative of a degree of similarity between the first and second images according to at least one given likeness criterion is calculated, wherein this similarity parameter varies between the first and second values, including a predetermined intermediate threshold value (that is to say that when varying the similarity parameters between the first and second values, this similarity parameter will adopt/ will pass through said predetermined intermediate threshold value), wherein the first value corresponds to a high degree of likeness between the first and second images and the second value corresponds to a low degree of likeness between these first and second images, wherein the signal representative of suspected detection of fraud is issued to indicate a suspected instance of fraud when said similarity parameter adopts a value located between said intermediate threshold value and said first value which corresponds to a high degree of likeness according to said at least one given likeness criterion.

The degree of likeness between the first and second images is determined based on at least one predetermined given likeness criterion.

Hence, the first value corresponding to a high degree of likeness between the first and second images is determined based on this at least one given likeness criterion. Likewise, the second value corresponding to a low degree of likeness between these first and second images is also determined based on this same at least one given likeness criterion.

Owing to this preferential embodiment of the method according to the invention, if the images have a high degree of likeness according to said at least one given criterion, i.e. if the similarity parameter has a value located between the first value and the predetermined intermediate threshold value, it will be detected that it is highly likely that an instance of attempted fraud is involved. In this case, the signal indicating that suspected fraud is involved will be generated.

Some characteristics of the iris of a genuine eye, such as spots of melanin in the iris, appear clearly in an image produced using a sensor solely sensitive in the visible light spectrum, but do not appear in an image produced using a sensor solely sensitive in the near infra-red spectrum.

Conversely, some of the characteristics of the iris of the genuine eye, such as iris texture, are only visible in the second image in the near infra-red spectrum and not in the first image in the visible spectrum. Hence, dark irises have texture data that is under the melanin and which is apparent in the second image in the near infra-red spectrum, but not in the first image in the visible spectrum. These texture data visible in the second image are particularly rich and represent biometric data.

The likeness between the first and second images respectively in the visible spectrum and in the near infra-red spectrum may thus imply that in one of the two images, characteristics visible in the other image are visible, whereas, in the case of a genuine iris, they should not be observed in these two images.

By means of the method according to the invention, a likeness parameter for similarity between the two images can be determined taking account of at least one given likeness criterion. Subsequently, if this likeness parameter points to a similarity/likeness between these images, there will then be a strong suspicion of detection of attempted fraud and said signal representative of attempted fraud is then emitted.

Conversely, if, according to the likeness criterion adopted, the likeness parameter points to little likeness between these first and second images, there will not be any objective reason establishing attempted fraud. In this case, one will wait for detection of a sign of attempted fraud before generating the signal representing suspected detection of fraud.

Preferentially, said calculation of the similarity parameter representative of a degree of similarity between the first and second images is performed by observing a first area of interest in the first image and a second area of interest in the second image, wherein these first and second areas of interest of the first and second images being representative of a same area of the iris observed.

Other examples of likeness criteria usable in order to implement the method according to the invention are presented below.

According to one embodiment of the method according to the invention, said at least one given likeness criterion involves the presence of an object visible in a given region of the first image and in a corresponding given region of the second image, wherein the similarity parameter has a calculated value located between said intermediate threshold value and said first value which corresponds to a high degree of likeness in case of the presence of said object.

Calculation of the similarity parameter or likeness criterion between images can employ the MSER method, presented in the publication by J. Matas, O. Chum, M. Urban, and T. Pajdla, "Robust wide baseline stereo from maximally stable extremal regions." Proc. of British Machine Vision Conference, pages 384-396, 2002. According to an embodiment of the method according to the invention, said at least one likeness criterion comprises a number of spots present in the first image and also present in the second image, wherein the likeness parameter has a calculated value located between said intermediate threshold value and said first value which corresponds to a high degree of likeness if this number of spots is greater than or equal to 1.

In other words, if at least one spot, typically of melanin, is detected both in the image in the visible light spectrum (first image) and in the image in the near infra-red spectrum (second image), the calculated likeness parameter is such that a sufficient likeness is considered to exist between these first and second images and the signal informing of suspected fraud is subsequently generated.

Detection of one or several visible spots in the image in the near infra-red spectrum and also visible in the image in the visible light spectrum increases the chances that an instance of attempted fraud is involved.

Indeed, a spot appearing in the first image in visible light generally indicates a specific melanin density at several adjacent points in the iris observed.

The variation in melanin density is not normally visible however in a near infra-red spectrum and only the texture of the iris should be visible in the latter.

If the iris observed in the first and second images is genuine, the apparent spot(s) in the first image in the visible light spectrum should be invisible in the second image in the near infra-red spectrum.

Conversely, if the object observed in the first and second images is a reproduction, obtained for example from an image of an iris produced in the visible spectrum, a false iris or an image of an iris, such as an inkjet or laser print of a photo of an iris, it will then be possible to identify one or several apparent spots both in the first image and in the second image.

This likeness between the two images, according to the criterion of number of spots, will be considered sufficient, strong or striking, leading to suspect an instance of attempted fraud. The similarity parameter calculated based on these two images will subsequently have a calculated value located between said intermediate threshold value and said first value corresponding to a high degree of likeness.

The signal representing suspected detection of fraud is subsequently emitted to indicate a suspected incidence of fraud.

As surprising as it may appear, if, as a function of the likeness criterion adopted, it is found that the first and second images are strongly alike, attempted fraud is suspected and a signal indicating this suspicion will be generated.

According to another embodiment of the method according to the invention (possibly complementary to the previous method in which the likeness criterion is a number of spots), the likeness criterion may be a statistical distance between the first and second images.

In this case, said similarity parameter is obtained using a statistical distance value between:
 a first data series obtained by measuring said respective optical characteristics of pixels of this first image; and
 a second data series obtained by measuring said respective luminous intensities of pixels of the second image.

The statistical distance between these two images is determined for example using a Chi2-type distance.

Use of a statistical distance to calculate the likeness criterion makes it possible to obtain background information quantified precisely based on the similarity between the first and second images and on difference between the textures of these images.

In this embodiment, the similarity parameter is calculated using a statistical distance value.

If the similarity parameter depending on this statistical distance between the first and second images is greater than the predetermined threshold value, it will be apparent that there is sufficient similarity between these images to suspect an instance of attempted fraud. The attempted fraud signal can subsequently be generated.

In a specific embodiment:
 on the one hand, the first data series is obtained by calculation using measured characteristics of pixels of the first image, wherein this first data series constitutes a descriptor of an apparent texture in this first image; and
 on the one hand, the second data series is obtained by calculation using measured characteristics of pixels of the second image, wherein this second data series constitutes a descriptor of an apparent texture in the second image.

By way of example, a texture descriptor may comprise Gabor filters such as those described in the patent of John Daugman U.S. Pat. No. 5,291,560.

Others types of texture descriptor may be used to implement the process according to the invention, the aim being to supply first and second series of standardised data allowing a standardised comparison of the images, thereby facilitating calculation of the parameter of similarity between the first and second images and fraud detection having a reliability determined by standardisation of the data processed/used.

BRIEF DESCRIPTION OF THE DRAWINGS

Other characteristics and advantages of the invention will be clearly apparent from the description thereof given below, provided as an illustration and by no means limitative while referring to the appended drawings, in which:

FIG. 2a shows generation of the first and second images of a genuine eye comprising spots of melanin, wherein the first image is viewed in a visible light spectrum and the second in a near infra-red spectrum;

FIG. 2b also shows first and second images, but a reproduction of an eye/false eye having spots that may be spots of melanin is seen here; the presence of these spots on the first and second images is noted, which is a sign of attempted fraud;

DETAILED DESCRIPTION OF THE INVENTION

Figure 1:
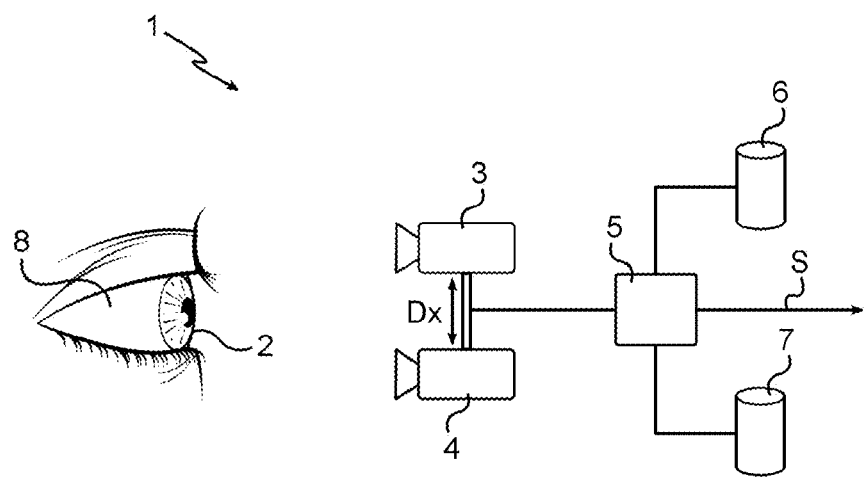
FIG. 1 shows a diagrammatic view of an iris recognition system according to the invention.

The invention relates to a method of detecting attempted fraud against a system for recognising the iris of the human eye.

The invention also relates to a system for recognising the iris of the human eye employing the method according to the invention, wherein this system may be part of a border control system or a building access control system.

The invention also concerns a fixed terminal, i.e. a border control terminal or a building access control terminal, or on a mobile terminal, i.e. a portable device (such as a smartphone, or a tablet computer) allowing data processing and exchange and incorporating the recognition system according to the invention.

A system 1 for recognising the iris 2 according to the invention comprises at least:
 first means of image capture sensitive in a visible light spectrum;
 second means of image capture 4 sensitive in a near infra-red spectrum;
 a calculation device 5 connected to said first and second means of image capture;

possible first storage means 6 for storing pre-recorded biometric characteristics of at least one iris of a known individual, wherein these possible first storage means are connected to the calculation device;

second storage means 7 for storing at least one first image 3a of an iris of the human eye observed using first means of image capture 3 and at least one second image 4a of said iris observed using second means of image capture 4.

When these first storage means 4 exist, they may be integrated in a terminal of the system or be integrated in a server of the system, remote from the terminal, wherein this terminal may be mobile or fixed.

The calculation device 5 is arranged to execute the fraud detection process according to the invention.

To this end, the calculation device 5 is arranged so as to execute a recognition operation involving recognising, in at least one image generated by the first and/or second means of image capture 3 4, biometric characteristics of the known individual if the biometric characteristics of the iris of this known individual are pre-recorded in the first storage means 6 and if they are also apparent in this at least one image. This at least one image is for example the first or the second image 3a, 4a or another image selected from among a series of images containing at least one of these first or second images 3a, 4a.

The calculation device 5 is also adapted so as to generate, depending on the result of execution of this recognition operation, an authentication or identification signal, indicating whether the biometric characteristics of the iris of the known individual have been recognised.

Following the method according to the invention:
using the first means of capture 3, an iris is observed and a first image 3a of this iris 2 is generated in the visible light spectrum;
using the second means of capture 4, this iris is observed and a second image 4a of this iris 2 is generated in the near infra-red spectrum.

These first and second means of capture may belong to the same sensor or several separate sensors.

The images 3a, 4a are stored using the second storage means 7, which comprise at least one RAM and if necessary a local permanent memory located in the terminal and/or a remote permanent memory located on a server remote from the terminal and forming part of the system.

As stated above, the first image 3a is a colour image, i.e. composed of several broad spectrum colours, i.e. an image having colours distributed over a spectrum of at least 50% of the width of the frequency range of 380 nm-700 nm.

As illustrated in FIGS. 2a and 2b, the iris 2 observed has areas with more or less high melanin densities. Some of these areas form spots T, wherein a spot T corresponds to a part of the iris 2 displaying a high localised melanin density with a substantial differential concentration of melanin versus neighbouring areas of the spot T.

The iris observed in FIG. 2a is a genuine human iris V whereas the iris observed in FIG. 2b is a reproduction R of a genuine human iris. This reproduction R is used to attempt to deceive the recognition system according to the invention and try to carry out fraud. This reproduction R is a fake such as a photograph or a printed image.

Whether the genuine iris V illustrated in FIG. 2a or the reproduction of an iris R illustrated in FIG. 2b is involved, it is noticed that the spots T appear clearly on each first image 3a produced in the visible spectrum, based on a genuine iris or a colour image of an iris.

It is noticed in the second image in the near infra-red spectrum 4a of FIG. 2a (near infra-red image by observing a genuine iris V) that variations in melanin density, such as the spots T, observable in the first image 3a, are not observable in image 4a.

Conversely, it is noticed in the second image in the near infra-red spectrum 4a of FIG. 2b (near infra-red image by observing a reproduction R of an iris) that variations in melanin density, such as the spots T, observable in the first image 3a, remain at least partly observable in the image 4a.

When the first and second images 3a, 4a are obtained from observation of a genuine iris V, there is less likeness between images 3a, 4a than when these images are the result of observation of a reproduction R of an iris 2.

This phenomenon is essentially related to a property of melanin, which is less visible when observed in the near infra-red spectrum.

As will be explained below, the iris recognition system employing the method according to the invention is arranged, depending on a given likeness criterion, so as to determine a similarity between the first and second images 3a, 4a and to condition generation of the signal S representative of suspected fraud as a function of the value adopted by a similarity parameter Param representative of a degree of likeness between these images 3a, 4a.

To this end, the calculation device 5 of the iris recognition system:
determines at least one characteristic of the first image 3a, wherein this at least one characteristic is determined as a function of respective optical characteristics of pixels of a plurality of pixels of the first image; and
determines at least one characteristic of the second image 4a, wherein this latter at least one characteristic is determined as a function of respective luminous intensities of pixels of a plurality of pixels of this second image.

As a function of said at least one characteristic of the first image 3a and of said at least one characteristic of the second image 4a, the calculation device 5 generates or does not generate a signal S representative of suspected detection of attempted fraud.

Using both characteristics of the first image and characteristics of the second image to decide whether to generate the signal S representative of suspected detection of attempted fraud allows correlation of these characteristics of the images in order to increase the detectable range of frauds.

For instance, in case of fraud carried out by presenting an image of an iris in the infra-red spectrum, the first and second images 3a and 4a generated are then alike with absence of melanin in both these images. This similarity between these two images 3a, 4a allows identification of the instance of attempted fraud.

More specifically, as will be explained by reference to FIGS. 3, 4 and 5, using said at least one characteristic of the first image 3a and said at least one characteristic of the second image 4a, a likeness parameter Param is calculated, representative of a degree of likeness between the first and second images according to at least one given likeness criterion.

This similarity parameter varies between first and second values, including a predetermined threshold value. In a preferential embodiment presented hereafter, one or several correction factors F1, F2 are calculated and used to define the similarity parameter Param. This similarity parameter Param is rendered more robust, thus enhancing the reliability of the fraud detection method according to the invention.

Indeed, these correction factors F1, F2 allow standardisation of the data used to calculate the similarity parameter Param. Use of a predetermined intermediate threshold value is therefore useful in order to adjust the sensitivity/similarity level required to trigger or not trigger emission of the signal S.

Calculation of the similarity parameter Param makes it possible to obtain an objective scale for assessing the similarity between the images according to the given likeness criterion/criteria.

The first value corresponds to a high degree of likeness between the first and second images 3a, 4a, whereas the second value corresponds to a low degree of likeness between these first and second images 3a, 4a.

The signal S representative of suspected detection of fraud is emitted to indicate a suspected instance of fraud when said similarity parameter Param adopts a value located between the intermediate threshold value and the first value corresponding to a high degree of likeness according to said at least one given likeness criterion.

As a function of the intermediate threshold value selected, the mode of operation of the fraud detection method is adapted between:
- a situation in which there would be a high probability of generating false alarms involving additional work in analysing these alarms in order to distinguish the false alarms from the true alarms; and
- a situation in which there would be a high probability of generating false alarms involving less additional analysis work, but increasing the likelihood of failing to detect an instance of fraud.

Hence, choice of the threshold value will depend on the type of application for which the method according to the invention is intended.

Although it is possible to select the intermediate threshold value from among several possible threshold values depending on the characteristics of the iris observed, this embodiment is not preferential, since it is preferred to standardise the data allowing calculation of the similarity parameter Param. Preferentially, the optical characteristics of pixels of the plurality of pixels of this first image comprise the respective luminous intensities of pixels of this plurality of pixels.

This embodiment is advantageous, since it makes it possible to obtain a comparison criterion based on a same type of optical characteristic, i.e. the luminous intensities of pixels of images 3a, 4a. This facilitates calculation of the similarity parameter Param.

According to an alternative embodiment, the optical characteristics of pixels of the plurality of pixels of this first image 3a comprise the respective colours of pixels of this plurality of pixels.

Using the means of image capture 3 sensitive in the visible spectrum, a first image 3a is generated which is in colour and each of the pixels of which is at least characterised by an own colour and by an own luminous intensity which form the optical characteristics of this pixel.

In the event that said at least one characteristic of the first image is a specific spot T on the image 3a, this spot T can be located using the respective colours of pixels of the image. For example, the spot can be defined by seeking adjacent pixels in the image that have, to within a predetermined difference in colour, a common colour different from colours of other pixels of the image adjacent to the pixels of the spot T.

In this embodiment, the spot is identified by the variation in the colours of the pixels in the first image 3a.

It is also possible for this spot to be identified by combined analysis of characteristics of variation in colour and characteristics of variation in luminous intensity between pixels of this first image 3a. According to this embodiment, said optical characteristics of pixels of the plurality of pixels of this first image comprise both the luminous intensities and the respective colours of pixels of this same plurality of pixels of the first image.

Figure 4:
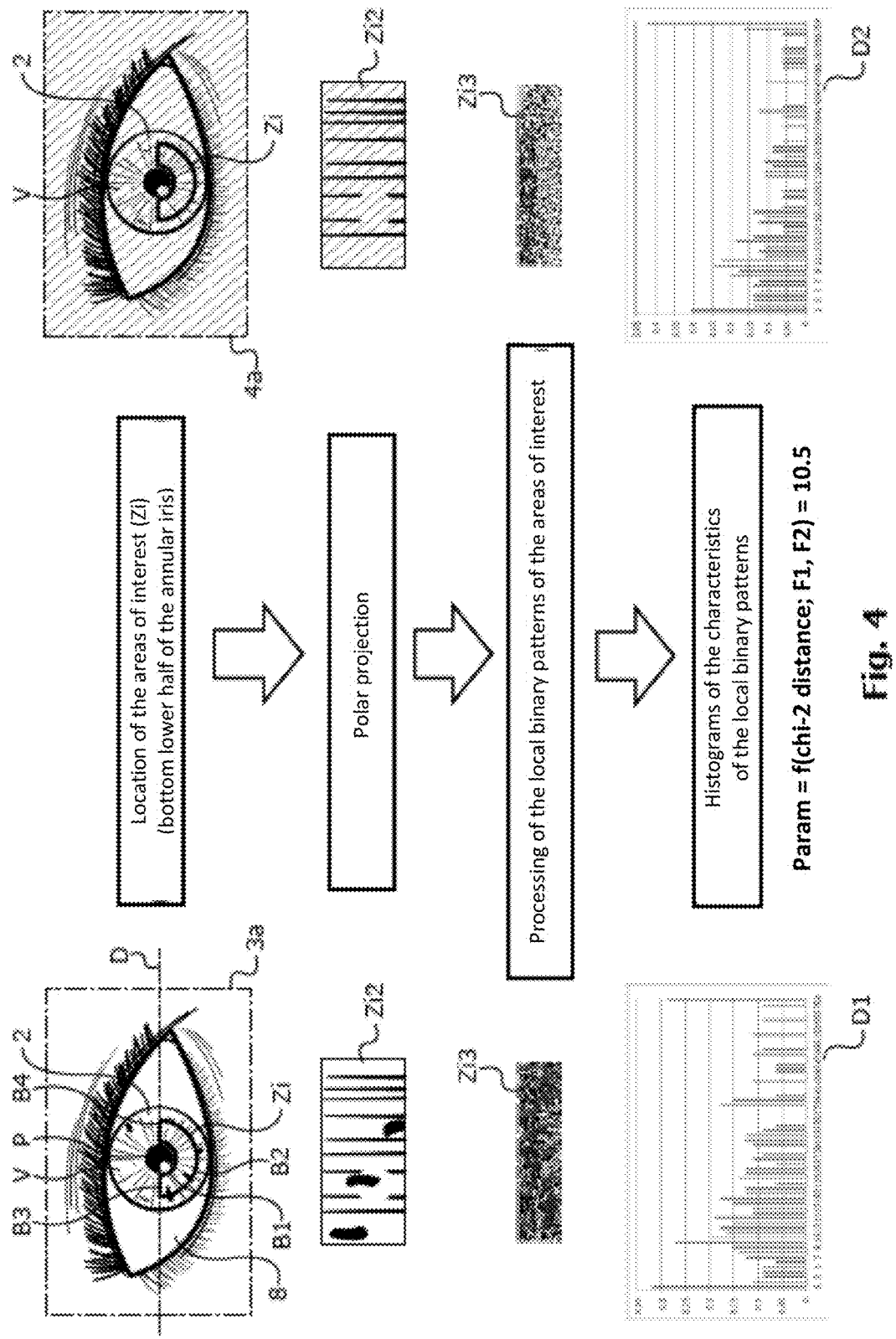
FIG. 4 illustrates the method according to the invention during its application to recognition of a genuine iris, with in this case little likeness between the first and second images according to the statistical distance criterion.
Figure 5:
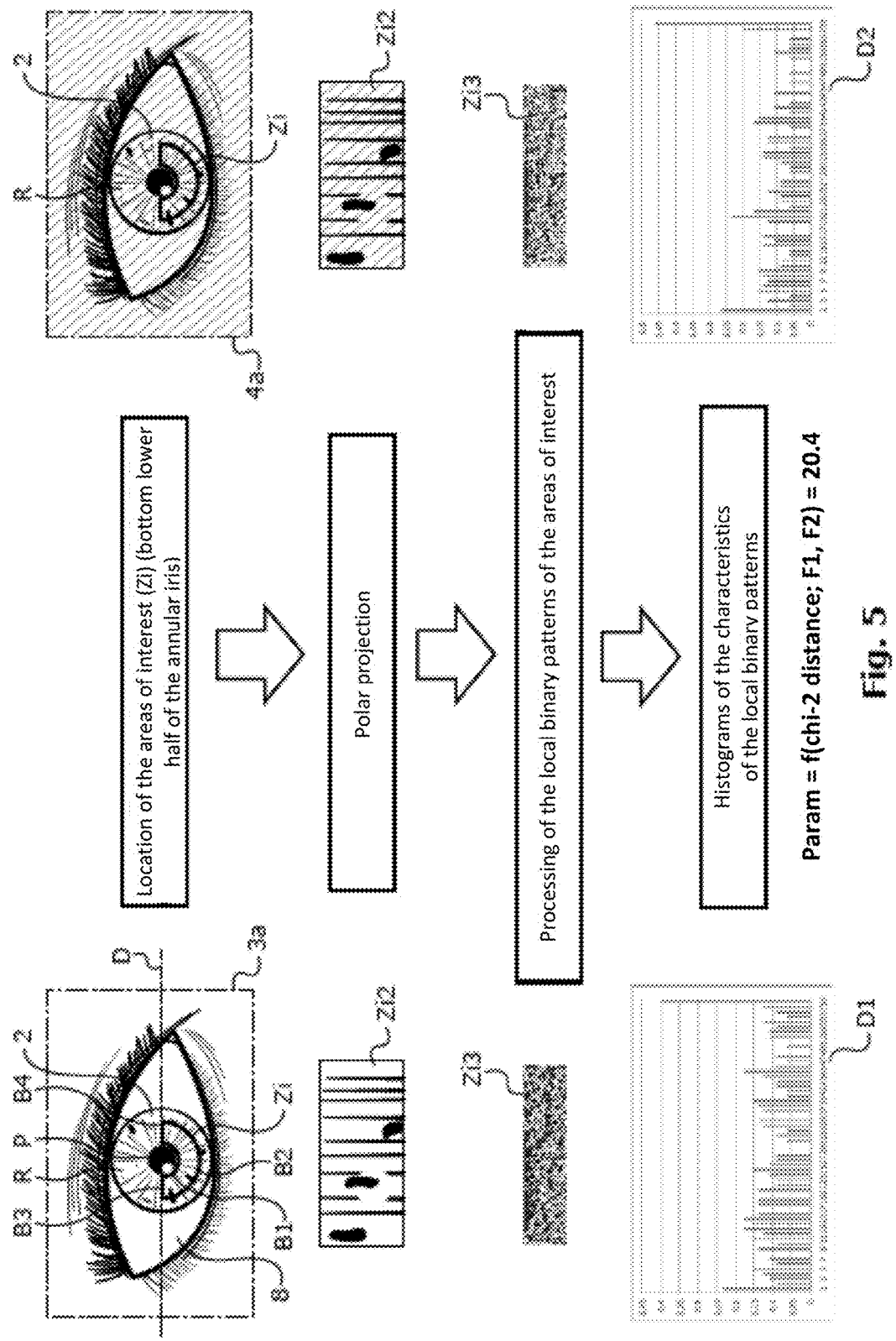
FIG. 5 illustrates the same elements as in FIG. 4, but in this case, the iris seen is a fake/reproduction and a high degree of likeness is observed between the first and second images, thereby implying a strong suspicion of fraud and emission of a signal representing suspected detection of fraud.

According to a particular embodiment of the invention, illustrated in FIGS. 4 and 5, said similarity parameter Param depends on a statistical distance value between:
- a first data series D1 obtained by measuring said respective optical characteristics of pixels of this first image 3a (in the present case, the respective luminous intensities of the pixels of the plurality of pixels of the first image 3a are involved here); and
- a second data series obtained by measuring said respective luminous intensities of pixels of the second image 4a.

FIG. 4 illustrates an example of processing performed according to a particular embodiment of the method according to the invention and based on observation of a genuine iris using the first and second optical means 3, 4.

FIG. 5 also illustrates an example of processing performed according to said particular embodiment of the method according to the invention, but based on observation of reproduction of an iris R via the first and second optical means 3, 4.

In both cases of FIGS. 4 and 5, once the first and second images 3a, 4a have been obtained, a first stage involves locating areas of interest Zi in these images, wherein these areas of interest Zi correspond to the same region observed of the iris observed.

For this purpose, the method according to the invention comprises:
- a stage of locating a first area of interest Zi in the first image 3a, wherein the pixels of said plurality of pixels in the first image 3a are exclusively contained in this first area of interest Zi; and
- a stage of locating a second area of interest Zi in the second image 4a, wherein the pixels of said plurality of pixels in the second image 4a are exclusively contained in this second area of interest Zi.

These first and second areas of interest Zi correspond to a bottom part of the iris 2 observed.

It is preferred that the pluralities of pixels to be studied be situated/correspond to the bottom part of the iris observed, since an area rich in features is involved, less likely to be concealed by an eyelid or by eyelashes.

The areas of interest Zi can be defined using a definition method comprising:
- definition of an inner edge B1 of the area of interest by contrast in brightness between the pupils which is dark and the iris which is lighter when observed in the first image 3a;
- definition of an outer edge B2 of the area of interest by contrast of colours in the first image, at the position of an outer limit of the pupils and of the sclera 8 which forms the white of the eye in the bottom part of the eye; and
- definition of first and second upper edges B3, B4 of the area of interest, wherein both these upper edges B3, B4 are formed by segments of a straight line D preferentially horizontal in the image and possibly extending perpendicularly in relation to an iris radius 2 passing through the centre of the pupil P.

The method of defining areas of interest Zi comprises definition of four intersection points between this straight line D and the inner B1 and external B2 edges which are each in the form of an arc. Among these four intersection points, two points are situated to the left of the iris radius and two points are situated to the right of this iris radius.

The first upper edge B3 corresponds to the segment of curve D extending between the two points to the left of the iris radius and the second from the upper edge B4 corresponds to the segment extending between the two points to the right of the iris radius.

A closed perimeter is thus formed in which the area of interest Zi is located.

In summary, this closed perimeter is composed successively:
- of the first upper edge B3 (in the shape of a line segment);
- of the lower edge B1 which is in the shape of an arc located between the pupil P and the iris 2, wherein the centre of this arc is the centre of the pupil P;
- of the second upper edge B4 (line segment); and
- of the outer edge B2 which is in the shape of an arc located between the iris and the sclera 8, wherein the centre of this arc is also the centre of the pupil P.

A polar projection of each of the areas of interest of the first and second images can be performed so as to obtain first and second data series characterising the first and second images 3a, 4a respectively. This polar projection allows standardisation of the data so that the latter are less sensitive to pupillary dilation and absolute size, thus facilitating comparison between the images. By way of example, a polar projection is described in patent document U.S. Pat. No. 5,291,560.

Via this polar projection each arc-shaped area of interest is transformed into a projected area of interest with a substantially rectangular shape Zi2. One therefore obtains a projected area of interest derived from observation of a lower portion of iris in the visible spectrum and a projected area of interest derived from observation of this same lower portion of the iris in the near infra-red spectrum.

Each projected area of interest Zi2 is subsequently processed by processing local binary patterns (processing known by the acronym LBP for Local Binary Patterns) present in this area of interest Zi2 and a representation Zi3 of the area of interest in a digital form is obtained.

In summary, the first data series D1 used to calculate the statistical distance is obtained by calculation, for each given pixel of the plurality of pixels of the first image 3a, of a standard deviation with a luminous intensity between this given pixel and pixels of this same plurality of pixels that are adjacent/close to it.

The data of this first data series D1 comprise the number of occurrences observed for each standard deviation thus calculated.

The second data series D2 is obtained by calculation, for each given pixel of the plurality of pixels of the second image 4a, of a standard deviation with a luminous intensity between this given pixel and pixels of this same plurality of pixels that are adjacent to it. The data of this second data series D2 comprise the number of occurrences observed for each standard deviation thus calculated.

These data of the first and second data series D1, D2 are represented in the form of histograms in FIGS. 4 and 5 with, as the ordinate, the number of occurrences of a given standard deviation and as the abscissa, the value of the given standard deviation, i.e. the value of the code of the binary pattern.

In other words, it is a matter:
- on the one hand, of establishing the first data series D1 by determining local binary patterns LBP in the plurality of pixels of the first image 3a; and
- on the one hand, of establishing the second data series D2 by determining local binary patterns LBP in the plurality of pixels of the second image 4a.

For each plurality of pixels of a given image 3a, 4a, these local binary patterns LBP are determined by calculations of differences in luminosities between mutually adjacent pixels in this plurality of pixels of this given image 3a, 4a.

Finally, having defined these first and second data series D1, D2, a statistical distance value is calculated between these first and second data series D1, D2. This statistical distance value may constitute said parameter of similarity between the first and second images 3a, 4a or preferentially, it may be used to define this parameter of similarity between these images 3a, 4a with other correction factors.

Preferentially, in order to calculate the parameter of similarity Param between the first and second images 3a, 4a, a first correction factor F1 is used, determined as a function of colours and pixels of this first image 3a. The colour of pixels of the first image 3a is a criterion allowing estimation of the melanin density of points of the iris represented in the first image 3a.

Hence, this first correction factor F1 takes account, at least indirectly, of the estimated melanin density in this iris.

This first correction factor F1 can be determined following a given rule. For example, according to this rule, the first correction factor F1 adopts a first value for a predominately blue iris, a second value for a predominately grey iris, a third value for a predominately brown iris and a fourth value for a predominately black iris. The first value is less than the second value, the second value is less than the third value and the third value is less than the fourth value.

Hence, for a predominately blue iris (the predominant colour in the area of interest of the iris is the leading colour in this area of interest), the first factor F1 will have a low value, known as the first value. Conversely, for a predominately black iris, the first factor F1 will adopt a high value known as the fourth value.

In other words:
- in the case of a light-coloured iris, with mainly little melanin, there will be a low correction factor F1 in order to obtain only slight correction of the data used to calculate the parameter of similarity between the first and second images; and
- in the case of a dark iris, with mainly a large amount of melanin, there will be a high correction factor F1.

Preferentially, in order to calculate said parameter of similarity between the first and second images, a second correction factor F2 is used determined as a function of a level of entropy of the first image 3a and/or as a function of a level of entropy of the second image 4a.

The more a given image contains different data and the higher its entropy, the more this image will be rich in data and the more it will be interesting in terms of image quality.

This second correction factor F2 is calculated as a function of the level of entropy in one at least of the first and second images or of the levels of entropy observed in both these images.

The lower the entropy of the images and the greater the likeness of the images, the more the similarity will therefore increase with a probability of a false alarm for a given threshold that increases.

In other words, the lower the entropy level in an image and the poorer the image, the more the second correction factor F2 chosen will have a low value. Hence, the poorer the image observed in entropy/texture, the more the value of the similarity parameter is reduced by the second factor F2.

The greater the level of entropy in an image, the more the image will be rich in texture. In this case, this second correction factor F2 is selected to obtain a high value. Hence, the richer the image observed in entropy/texture, the more the value of the similarity parameter is maximised by the second factor F2.

In other words, for an image displaying a high density of texture data, a high level of entropy is obtained. Conversely, if the image is blurred or saturated or if a hardware failure of the sensor used to generate this image has occurred, few or no texture data will be obtained on the image. It is highly likely in this case that the deviation parameter between the first and second images is not relevant in being able to decide whether or not an instance of attempted fraud exists. One subsequently seeks to reduce the value of the similarity parameter so that it falls under the predetermined threshold and in order to avoid generating the signal S indicating that in principle fraud exists. A more detailed analysis can be performed to ascertain whether genuine attempted fraud is involved, or a technical problem causing a poor-quality image or poor-quality images.

The entropy of an image can be calculated by observing the entire image or preferentially by observing solely the area of interest of this image.

This entropy calculation may employ searching in the image or in the area of interest Zi of the image, at least one object having an energy spectral density calculated over all or part of the intensity spectrum of a frequency band observable in the image. This spectral density can be calculated using a mean response intensity in a given frequency filter applied to the image, wherein this frequency filter defines said given frequency band observable in the image.

In summary, the similarity parameter Param can be expressed by the equation:

Param=$f$(static distance Chi-2; F1; F2);

or more specifically by the equation:

Param=$F1*F2$/(Chi-2 statistical distance).

In the example in FIG. 4 in which the iris observed is a genuine iris, the similarity parameter Param calculated based on the Chi-2 statistical distance between these images 3$a$, 4$a$/data series D1, D2 and correction factors F1, F2 adopts a value of 10.5.

In the example in FIG. 5 in which the object observed is a reproduction R of an iris, it is observed that the similarity parameter Param calculated based on the Chi-2 statistical distance between these images 3$a$, 4$a$/data series D1, D2 and correction factors F1, F2 adopts a value of 20.4.

Hence, it is established that the images 3$a$, 4$a$ of the reproduction R have a greater degree of similarity than the images 3$a$, 4$a$ produced by observing a genuine iris.

If, as in FIG. 4, the similarity parameter Param calculated based on the statistical distance calculated is 10.5, this similarity parameter is below the previously selected threshold value. In this case, it is established in principle that the images 3$a$, 4$a$ result from observation of a genuine iris.

In case of observation of a genuine iris V, it can be decided to generate a signal S representative of absence of detection of attempted fraud.

Conversely, if, as in FIG. 5, the similarity parameter Param (20.4) calculated based on the statistical distance is above the selected threshold value, it is established in this case that in principle, the images 3$a$, 4$a$ result from observation of a reproduction R of an iris or that the images do not allow proper assessment of the risk of fraud.

In case of observation of a reproduction R, a signal S representative of suspected detection of attempted fraud can be generated.

Figure 3:
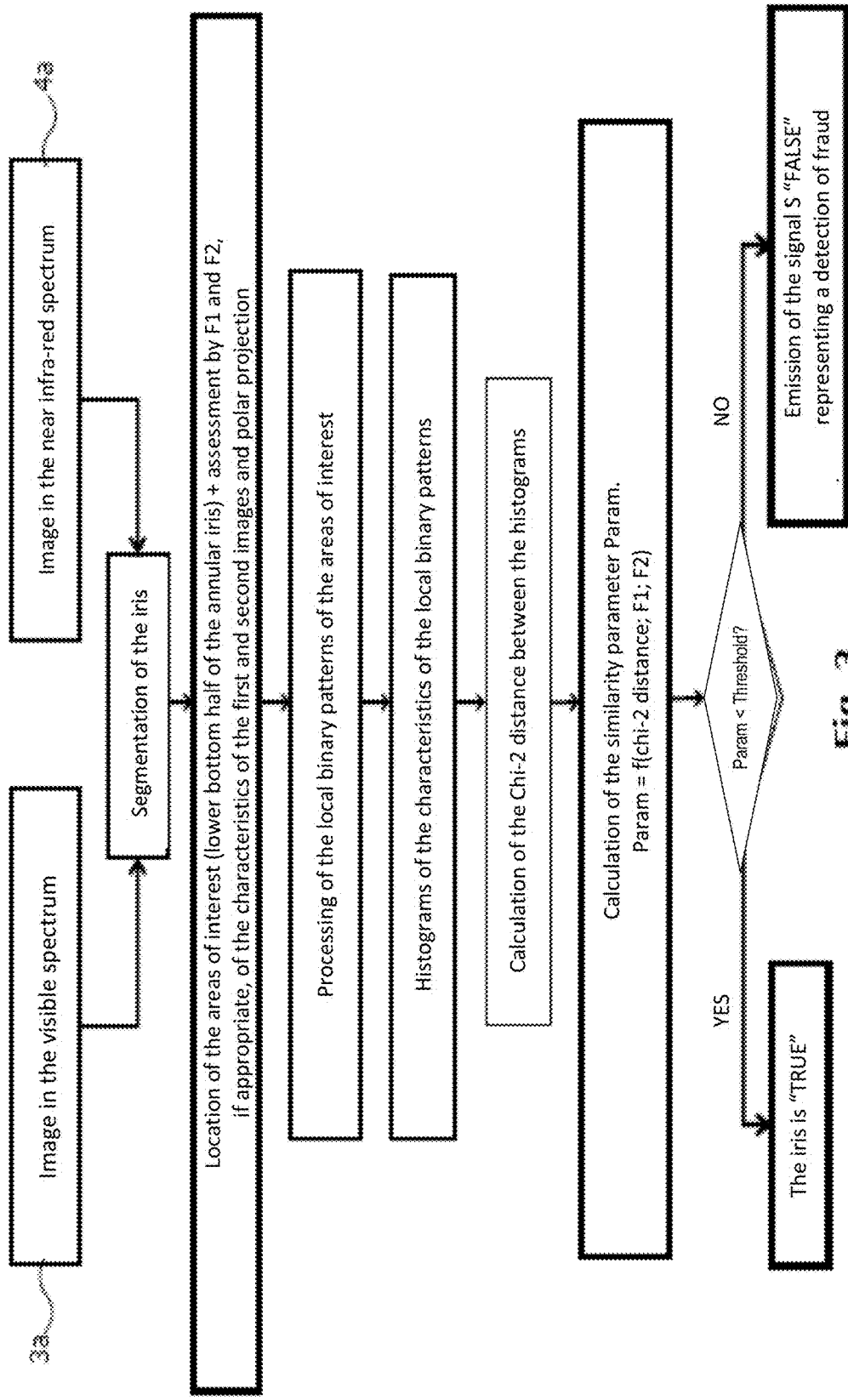
FIG. 3 shows an embodiment of the method according to the invention in which the likeness criterion used to detect attempted fraud is a statistical distance between data generated based on pixel characteristics of the first and second images.

The flow chart in FIG. 3 summarises the method according to the invention with initially generation of the first and second images 3$a$, 4$a$ or an iris of the human eye by observing the latter using the first and second means of capture 3, 4. Secondly, the iris represented in these images is segmented into several areas including at least one area of interest Zi of the iris visible in these two images and corresponding to a same area of the iris observed. Following this operation, the area of interest Zi is isolated and a polar projection of the area of interest of the first image 3$a$ and a polar projection of the area of interest of the second image 4$a$ is produced. The centre of projection for these polar projections is the centre of the iris. Each of these areas of interest transformed by polar projections is subsequently processed by processing of the local binary patterns respectively visible in these transformed areas of interest.

Subsequently, as illustrated in FIGS. 4 and 5, the data observed are distributed in the form of histograms of occurrence of each item of data in order to compile two data series D1, D2.

Finally, a Chi-2 statistical distance is calculated between these histograms/data series D1, D2. This Chi-2 statistical distance value is corrected by applying the first and second correction factors F1 and F2, making it possible to obtain a similarity parameter Param representative of the similarity between these images.

If this parameter Param is below the predetermined threshold, the first and second images 3$a$, 4$a$ are considered in this case to have a low degree of similarity, which implies that they were produced by direct observation of a genuine iris. In this case, the signal can adopt a value "TRUE". If this parameter Param is higher than the predetermined threshold, the images are considered to be strongly similar, which implies that the first and second images were produced by observing a reproduction R of an iris. The signal S can adopt a value "FALSE" indicating detection of an instance of attempted fraud.

In a specific embodiment, in case of absence of emission of the signal representative of detection of fraud and for as long as said similarity parameter Param has a value located between said intermediate threshold value and said second value corresponding to a low degree of likeness according to said at least one given likeness criterion, a signal of absence of suspected detection of fraud is subsequently emitted to indicate an absence of suspected fraud.

In other words, if the first and second images have a low degree of likeness according to said at least one given likeness criterion, i.e. if the similarity parameter has a value located between the second value and the predetermined intermediate threshold value, it will be detected that it is unlikely that an instance of attempted fraud is involved.

In this case and solely in the absence of emission of the signal representative of detection of fraud S emitted based on these same first and second images, a signal of absence of suspected detection of fraud is generated.

In the event that a signal representative of detection of fraud has been emitted based on the first and second images, no signal of absence of suspected detection of fraud will be emitted.

Different actions can be triggered depending on whether an instance of attempted fraud is detected or not. For example, in case of generation of the signal representative of suspected detection of attempted fraud, it is possible to:

prohibit execution of authentication or identification operations of the individual whose iris is represented in the first and second images; or order initiation of a waiting time of predetermined duration before allowing a further iris recognition attempt; or order cancellation in a database of identities, of the identity of a person whose iris has been used in this instance of attempted fraud; or order triggering of an alarm using alarm means of the system.

We will now describe two possible embodiments of the first and second means of image capture 3, 4.

In a first embodiment, the first means of image capture 3 comprise cells of a first type solely sensitive in the visible light spectrum and the second means of capture 4 comprise cells of a second type solely sensitive in the near infra-red spectrum, wherein these cells of the first and second type belong to a same electronic image sensor. In this case, the cells of the first and second type are mutually interposed and assembled on a same electronic image sensor medium, for example a plate of the sensor.

This allows use of one and the same electronic sensor to generate both images from a perspective common to both these images. Owing to this embodiment, there is no need to perform geometric registration of these two images in order to simulate acquisition of these images from one and the same perspective.

In a second embodiment (FIG. 1), alternative to the above, the first means of image capture 3 comprise cells of a first type solely sensitive in the visible light spectrum and the second means of capture 4 comprise cells of a second type solely sensitive in the near infra-red spectrum. The cells of the first belong to the same first electronic image sensor and the cells of the second type belong to the same second electronic image sensor. These sensors of the first and second type are spaced apart by a predetermined distance Dx.

In a second embodiment, the method may comprise an operation of registering the first and second images. This registration operation can be performed in different ways, by camera calibration or without camera calibration and by image processing.

One method may involve segmenting the iris in each image and subsequently performing log-polar transformation of these images and comparing the iris data present on the images, which amounts to placing the irises of these images in a common reference point.

Another method may involve using local descriptors allowing matching of the images and subsequently registration of these images.

Several documents describe image registration methods such as the SIFT method meaning "scale invariant feature transform" or the method in the publication "Lowe D. G., 1999, Object recognition from local scale invariant features, Proceedings of the International Conference on Computer Vision, vol. p. 1150-1157". A calibration method is also known from patent document WO2015071426 of the same applicant.

Simplistically, a registration operation may involve transforming the first and second images 3*a*, 4*a* so that they appear acquired from a same perspective, common to both these images by restricting the distortion related to the distance Dx to the angles between the optical axes of the cameras and other differences between these cameras such as their focal lengths.

Finally, according to a possible embodiment of the method according to the invention, it can be ensured that the method comprises:

a first test involving analysing the first image 3*a* which is in colour in order to establish, according to predetermined colorimetric analysis rules, whether or not the iris presented in this first image appears representative of a genuine iris;

a second test involving calculating said similarity parameter using said at least one given likeness criterion which comprises a number of spots T;

a third test involving calculating said similarity parameter by calculating a statistical distance value between the first and second data series D1, D2.

The first test may involve observing the colours of the iris displayed in the first image and establishing, according to predetermined colorimetric analysis rules, whether or not an image of an apparently real iris is involved. If the conclusion of this first test is that the first image is that of an apparently real iris, this first test is considered successful. If on the other hand the colours observed in this first image do not match the colours of a genuine iris, it is concluded that the test is unsuccessful and that a fake/reproduction R of an iris is involved.

If at least one of these tests has failed, the signal S representative of suspected fraud is generated.

The order of performance of the tests is preferentially first test, followed by second test, followed by third test. The signal S is generated as soon as one of these tests has failed. This makes it possible to limit the number of calculations necessary in order to generate the signal S while proceeding from the simplest to the most complicated test to perform.

Alternatively, these tests can be performed in parallel, wherein the signal S is always generated as soon as at least one of these tests has failed. It is also possible to combine these tests according to a probabilistic combination based on which it is decided, at this point, whether the signal S is to be generated.

Preferentially, as described above, it is arranged to calculate the similarity parameter between the images using one or several correction factors F1, F2 of the statistical distance between these images.

In some cases, the signal S representative of suspected detection of attempted fraud may indicate attempted fraud whereas in fact no confirmed instance of attempted fraud has occurred. In this case, the signal should be considered erroneous. Conversely, this signal S may indicate an actual instance of attempted fraud.

In order to facilitate confident use of the signal S, it is proposed according to the invention to generate a confidence indicator representative of a probability that the signal S representative of suspected detection of attempted fraud is generated for a confirmed instance of attempted fraud.

Ideally, this confidence indicator is calculated as a function of at least one specific feature of the first image 3*a* and at least one specific feature of the second image 4*a*.

Hence, when the signal S is generated, it is accompanied by a corresponding confidence indicator and one can decide whether to undertake specific actions depending on the one hand on the presence of the signal S and on the other hand on the value adopted by the confidence indicator. For example, when the signal S is generated whereas one at least of the first and second images is of very poor quality and displays for example very low entropy, the calculated confidence indicator will in this case adopt a value representative of very low probability that the signal S corresponds to an actual instance of attempted fraud. Conversely, when the signal S is generated whereas the first image displays very high entropy and the second image also display high entropy, the confidence indicator will adopt a value representative of high probability that the signal S corresponds to an actual instance of attempted fraud. In this embodiment, the specific feature of the first image used to calculate the confidence indicator is the entropy of the first image and the specific feature of the second image used to calculate the confidence indicator is the entropy of the second image. Hence, the confidence indicator in the signal S depends on specific features of these first and second images 3a, 4a.

The invention is not limited to that which has been described above and also includes other particularities, such as those presented below.

The signal representative of suspected detection of attempted fraud may indicate that there is no suspected attempted fraud or conversely that an instance of attempted fraud has been detected. In order to limit the risk of deluding the iris recognition system by presenting two separate objects in front of the first and second means of capture in order to make it appear that a single object is being acquired, it is arranged for the first and second means of capture to be mechanically linked via a rigid mechanical structure.

Preferentially, it is arranged for the first and second images 3a, 4a to be generated simultaneously in order to limit the risk of failing to detect an instance of attempted fraud. To this end, it is preferentially arranged for the first and second images 3a, 4a to be generated less than one second apart, preferentially less than a fiftieth of a second apart from each other and preferentially less than a hundredth of a second apart from each other. If one or several video acquisition devices are used as the first and second means of capture, with an acquisition capacity of 25 images per second, it is thereby arranged for the first and second images to be generated with an interval of less than $\frac{1}{50}$th of a second between these two images. This limits to a high degree the possibility that the images generated by the cameras during this interval are two different objects.

This reduces the risk of having fraud by successive presentation of two separate reproductions of the same iris respectively displaying the expected images in the visible and near infra-red spectrum.

The invention claimed is:

1. A method of detecting attempted fraud against a recognition system for recognising the iris of the human eye, comprising:
    generation of a first image of an iris of the human eye observed using first means of image captures sensitive in a visible light spectrum and over a frequency range covering at least 50% of the visible light spectrum, wherein this first image is a broad spectrum colour image;
    generation of a second image of sad iris observed using second means of image capture sensitive in a near infra-red spectrum;
    determination of at least one characteristics of the first image determined as a function of respective optical characteristics of pixels of plurality of pixels of this first image; and
    determination of at least one characteristic of the second image determined as a function of respective luminous intensities of pixels of plurality of pixels of this second image,
    wherein using said at least one characteristic of the first image thus determined and said at least one characteristic of the second image thus determined and a first correction factor determined as a function of colours of pixels of this first image, a similarity parameter representative of a degree of similarity between the first and second images according to at least one given likeness criterion is calculated, wherein this similarity parameter varies between a first and a second values, including a predetermined intermediate threshold value, wherein the first value corresponds to a high degree of likeness between the first and second images and the second value corresponds to a low degree of likeness between these first and second images, wherein a signal representative of suspected detection of fraud is generated to indicate a suspected instance of fraud when said similarity parameter adopts a value located between said intermediate threshold value and said first value which corresponds to a high degree of likeness according to said at least one given likeness criterion.

2. The method according to claim 1, wherein this first correction factor is determined according to a rule such that this first correction factor adopts a first value for a predominately blue iris, a second value for a predominately grey iris, a third value for a predominately brown iris and a fourth value for a predominately black iris, wherein the first value is lower than the second value, the second value is lower than the third value and the third value is lower than the fourth value.

3. The method according to claim 1, wherein in order to calculate said parameter of similarity between the first and second images, a second correction factor is used determined as a function of a level of entropy of the first image and/or as a function of a level of entropy of the second image.

4. The method according to claim 1, wherein the optical characteristics of pixels of the plurality of pixels of this first image comprise the respective luminous intensities of pixels of this plurality of pixels.

5. The method according to claim 1, wherein in case of absence of emission of the signal representative of detection of fraud and for as long as said similarity parameter has a value located between said intermediate threshold value and said second value corresponding to a low degree of likeness according to said at least one given likeness criterion, a signal of absence of suspected detection of fraud is subsequently emitted to indicate an absence of suspected fraud.

6. The method according to claim 1, wherein said at least one given likeness criterion involves the presence of an object visible in a given region of the first image and in a corresponding given region of the second image, wherein the similarity parameter has a calculated value located between said intermediate threshold value and said first value which corresponds to a high degree of likeness in case of the presence of said object.

7. The method according to claim 1, wherein said similarity parameter is determined using a statistical distance value between:
    a first data series obtained by measuring said respective optical characteristics of pixels of this first image; and
    a second data series obtained by measuring said respective luminous intensities of pixels of the second image.

8. The method according to claim 7, wherein:
    the first data series is obtained by calculation using said measured characteristics of pixels of the first image, wherein this first data series constitutes a descriptor of an apparent texture in this first image;

the second data series is obtained by calculation using said measured characteristics of pixels of the second image, wherein this second data series constitutes a descriptor of an apparent texture in this second image.

9. The method according to claim 1, furthermore comprising:
 a stage of locating a first area of interest in the first image, wherein the pixels of said plurality of pixels in the first image are exclusively contained in this first area of interest; and
 a stage of locating a second area of interest in the second image, wherein the pixels of said plurality of pixels in the second image are exclusively contained in this second area of interest, wherein these first and second areas of interest correspond to a bottom part of the iris observed.

10. The method according to claim 1, wherein the first means of image capture comprise cells of a first type solely sensitive in the visible light spectrum and the second means of capture comprise cells of a second type solely sensitive in the near infra-red spectrum, wherein these cells of the first and second type belong to a same electronic image sensor.

11. The method of claim 1, wherein the first means of image capture comprise cells of a first type solely sensitive in the visible light spectrum and the second means of capture comprise cells of a second type solely sensitive in the near infra-red spectrum, wherein these cells of the first type belong to a same first electronic image sensor and the cells of the second type belong to a same second electronic image sensor, wherein these sensors of the first and second type are space apart, with the method comprising an operation of registering the first and second images.

12. The method according to claim 1, wherein as function of at least one specific feature of the first image and of at least one specific feature of the second image, an indicator of confidence of detection of attempted fraud is calculated, wherein this confidence indicator is representative of probability that the signal representative of suspected detection of attempted fraud will be generated for a confirmed instance of attempted fraud.

13. A recognition system for recognising the iris of human eye, comprising at least:
 first means of image capture sensitive in a visible light spectrum and over a frequency range covering at least 50% of the visible light spectrum;
 second means of image capture sensitive in a near infra-red spectrum;
 a calculation device connected to said first and second means of image capture;
 first storage means for storing pre-recorded biometric characteristics of at least one iris of a known individual, wherein these first storage means are connected to the calculation device;
 second storage means for storing at least one second image and said iris observed using second means of image capture;
 wherein the calculation device is arranged to execute the fraud detection process according to claim 1.

* * * * *